UNITED STATES PATENT OFFICE.

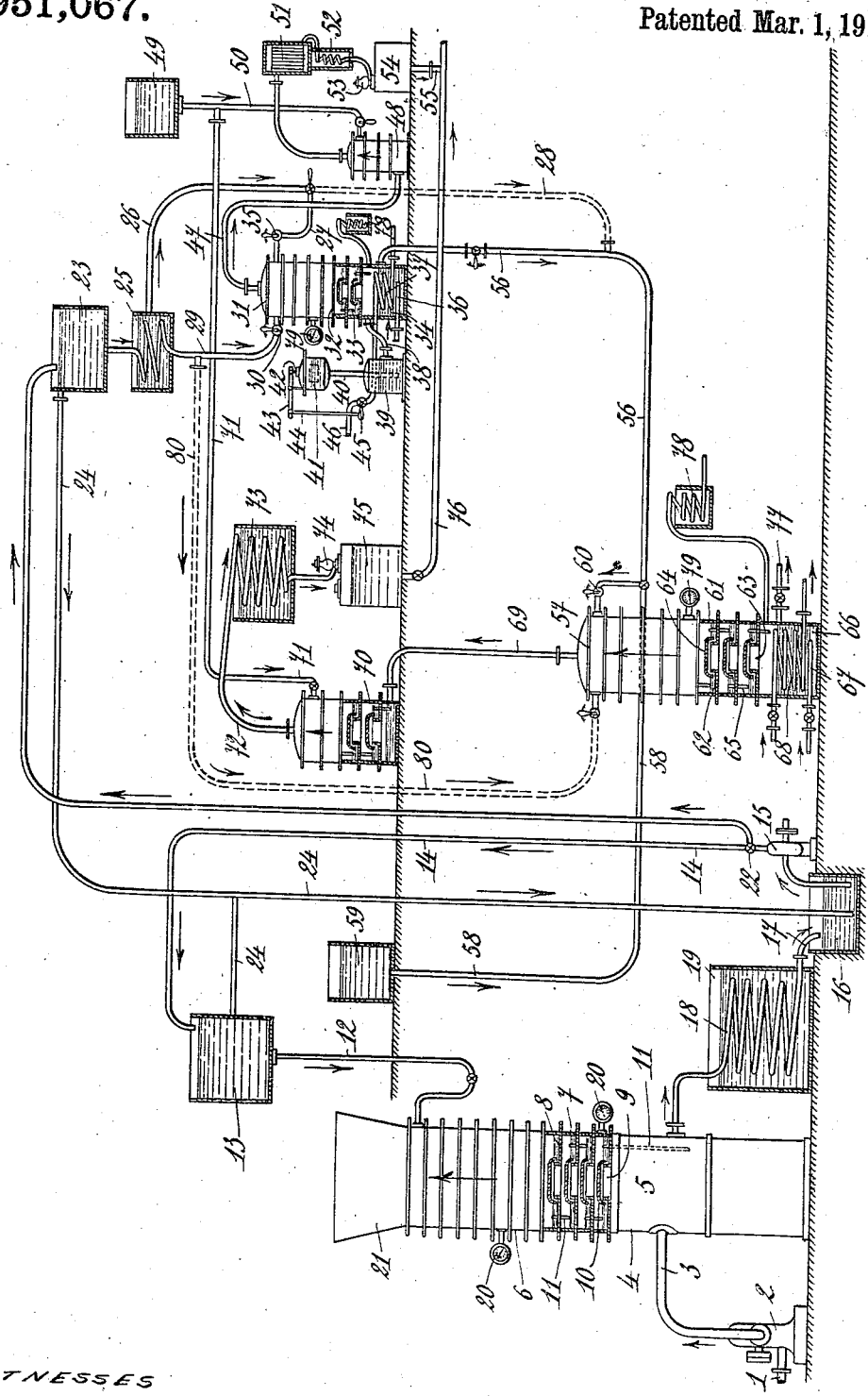
C. CREPELLE-FONTAINE.
APPARATUS FOR RECOVERING ETHER AND ALCOHOL.
APPLICATION FILED FEB. 27, 1909.
951,067.
Patented Mar. 1, 1910.

CHARLES CREPELLE-FONTAINE, OF LA MADELEINE LEZ LILLE, FRANCE.

APPARATUS FOR RECOVERING ETHER AND ALCOHOL.

951,067.      Specification of Letters Patent.      Patented Mar. 1, 1910.

Application filed February 27, 1909. Serial No. 480,441.

*To all whom it may concern:*

Be it known that I, CHARLES CREPELLE-FONTAINE, a citizen of France, residing at La Madeleine lez Lille, Nord, France, have invented new and useful Improvements in Apparatus for Recovering Ether and Alcohol, of which the following is a specification.

This invention relates to an apparatus for obtaining and recovering ether and alcohol which are diffused in the air in various industries, for example, in the manufacture of artificial silk and other products in which ether and alcohol are used as solvents or as agents in manufacture.

With this object in view, the invention consists, more particularly in a peculiar general arrangement of the apparatus for securing and separating the ether and alcohol, combined with saturators, condensers and distributers of hot water and steam allowing of obtaining a suitable regulation of the temperature and an exactly controlled working of the operation.

The accompanying drawing diagrammatically illustrates an installation according to the invention.

The air charged with ether and alcohol is drawn from the evaporator or drier through a pipe 1 connected to a fan 2 which forces it through a pipe 3 into an absorption apparatus 4. This apparatus comprises a base 5 surmounted by a body 6 formed of a series of rings 7 each provided with a plate 8, provided with a central passage 9 surmounted by a cap or cover 10. The different compartments formed between the plates 8 communicate with one another by means of overflow tubes 11. The mixture of air and vapors of ether and alcohol passes from the base 5 into each of the compartments formed between the plates 8 through the central openings 9 and comes into contact on the plates of the cases with acid (sulfuric acid) conducted to the upper part of the column by a pipe 12 leading from the tank 13 filled from the pipe 14 into which the acid is forced by a pump 15 which draws it from a tank 16 into which is poured by a pipe 17 the acid collected in the base 5 of the column and having passed through the coil 18 of a cooler 19. The air charged with ether and alcohol, by bubbling through the acid on each plate 8 is deprived of the ether and alcohol; the acid circulates in a continuous manner until it is found that the acid collected in the tank 16 is saturated. Two temperature indicators 20 placed on the absorption apparatus, one at the base and the other near the middle allow of watching the heating of the acid during the process. The absorption apparatus can be provided with a raised top 21 in the form of a truncated cone.

By operating a three way cock 22, the acid, when saturated with ether and alcohol, is forced by the pump 15, into an acid tank 23 serving to feed the recovering apparatus. This tank 23 is provided with an overflow pipe 24 also connected to the tank 13 and passing to the tank 16, in order to avoid any overflow.

From the feed tank 23, placed at a higher level than the other apparatus forming part of the installation, the saturated acid passes into a heater 25 raising the temperature of the acid, and simultaneously feeding with hot water the separating apparatus by a pipe 26 provided with branches 27 and 28.

On leaving the heater 25 the saturated acid is distributed through the pipe 29 and a cock 30, suitably graduated, into an ether separator 31. This apparatus is formed like the absorption apparatus already described, of a series of compartments 32 in which the liquid passes successively from one compartment to the other through overflow tubes 33 down into the base 34. Directly it enters the separator 31, the saturated acid has added to it a suitable volume of water corresponding to about the weight of the liquid to be distilled. This water is brought from the heating tank 25 through the pipes 26 and 27 and the exact regulation of the quantity of water is effected by a graduated cock 35. The separator 31 being designed to effect only the separation of the ether contained in the saturation acid coming from the feed tank 23, it is important to be able to very exactly regulate the temperature in that apparatus. This temperature is regulated by admitting steam through a steam injector 36 and by means of a heating coil 37 placed in the base 34 of the apparatus. The quantity of steam admitted into this coil is automatically regulated according to the pressure existing in the apparatus. To this end, a pipe 38 opening into the upper part of the base of the separator 31 communicates with a vessel 39 hermetically closed and containing a certain quantity of water into which dips a pipe 40 extending up to a float chamber 41. This float is connected by its stem 42 with an oscillating lever 43, controlling by a rod 44 the position of a flap valve 45 in the pipe 46 feeding the heating coil 37 with steam. Owing to this arrangement, the pressure in the apparatus 31 acts in the vessel 39 and more or less forces the liquid contained in this vessel into the float chamber 41 so that this float automatically regulates the heating according to the pressure, which allows of very exactly conducting the operation of distilling the ether in the separator 31. The ether vapors disengaged in this separator are conducted by a pipe 47 into a saturator 48 fed with soda water coming from a tank 49 connected by a pipe 50 with the upper part of the saturator 48. This saturator 48 is also composed of plates with caps and overflow tubes and operates in a similar manner to the separator 31. The ether vapors leaving this saturator pass into a condenser 51, which is preferably tubular and which is followed by a coil cooler 52. The liquid collected at the outlet of the coil 52 is received by a tester 53 which distributes it into a receiving tank 54, which may be connected to a pipe 55 allowing the liquid to be sent to rectifying apparatus.

The acid charged with alcohol, but freed from ether on its admission into the base 34 of the separator 31, is conducted by a pipe 56 into an alcohol separator 57, after the addition thereto of a certain quantity of dilute alcohol water fed by a pipe 58 from a tank 59. The distribution of the acid is effected by a graduated cock 60. The construction of the separator 57 is similar to that of the separator 31, and, consequently, comprises a certain number of rings 61 each provided with a plate 62 with central opening 63 surmounted by a cap or cover 64. The different compartments communicate with one another by means of overflow tubes 65 and the base 66 is provided with a steam inlet pipe 67 and a heating coil 68 which may also be combined, if necessary, with a feed regulator similar to that combined with the separator 31, while the acid charged with alcohol descends from plate to plate in the separator 57, the alcohol, disengaged by distillation and bubbling in the liquid, during its passage from one compartment to the other, finally passes out at the upper part of the separator through the pipe 69 which conducts it to a saturator 70, of a construction similar to the ether saturator 48. This saturator 70 is connected by a pipe 71, to the tank 49 for distributing the soda water. On leaving the saturator 70, the alcohol vapors are conducted by the pipe 72 into a refrigerating condenser with a coil 73 leading to a tester 74 combined with a receiving tank 75 for the distilled products which may be conducted through a pipe 76 to rectifying apparatuses. The exhausted acid collected in the base 66 of the separator 57 flows out through a pipe 77 leading to an apparatus for reconcentrating the acid. To the base 66 of the separator 57 just as to the base 34 of the separator 31 are connected controlling arrangements 78 for the exhausting of the acid. The separators are, besides, provided with a suitable number of temperature indicators 79.

In order to allow, if necessary, the treatment of the saturated acid in a single apparatus, a pipe 80 allows of directly connecting the pipe 29 to the separator 57 without causing the acid to circulate through the separator 31.

The absorption and separating apparatus 31 and 57, as well as the accessories, such as pipes and feed tanks, are of course constructed of material which is capable of resisting the action of the sulfuric acid, for example, cast iron lined with lead, sheet iron lined with lead, or in any other suitable manner.

Having thus described my invention, I declare that what I claim is:

1. An apparatus for recovering ether and alcohol, comprising an absorption receptacle, means for delivering the air charged with the ether and alcohol to said receptacle, means for feeding an acid to the upper part of said receptacle, an acid tank, means for carrying the acid saturated with the ether and alcohol from the receptacle to said tank, a recovering apparatus comprising means for separating ether and means for separating alcohol and means for connecting said apparatus with the acid tank.

2. In a device of the class described, the combination with an absorption receptacle, means for delivering air charged with the ether and alcohol to said receptacle, means for feeding acid to said receptacle, means for withdrawing the acid charged with the ether and alcohol from said receptacle, a separating apparatus for the ether and alcohol receiving the acid from the receptacle, and means for heating the acid previously to its treatment in the separator.

3. In a device of the class described, the combination with an absorption receptacle, means for feeding the air charged with the alcohol and ether to the bottom of said receptacle, means for feeding an acid to the top of the vessel, an acid tank, means for carrying the acid charged with the ether and alcohol from the receptacle to said tank, means for heating the said acid, a recovering apparatus comprising means for separating the ether, means for adding hot water to the acid and ether before being separated, means for connecting the acid tank with said separator, an independent alcohol separating means, and means for connecting said alcohol separating means with the ether separating means.

4. In a device of the class described, the combination with an absorption receptacle, means for delivering the air charged with alcohol and ether to the bottom of said receptacle, means for feeding acid to the top of said receptacle, an acid tank, means for carrying the acid charged with the ether and alcohol to said tank, means for heating said acid, and a recovering apparatus connected with the acid tank, said apparatus comprising an ether separating means, an ether saturator, a condenser, and an independent alcohol separating means and alcohol saturator, and an alcohol condenser.

5. In a device of the class described, the combination with the absorption receptacle, means for feeding the air charged with the ether and alcohol to the bottom of said vessel, means for feeding an acid to the top of said vessel, an acid tank, means for carrying the acid charged with the ether and alcohol to said tank, means for heating said acid, and a recovering apparatus comprising an ether separating means, means for heating the same, means for regulating the heating of said separating means and an independent alcohol separating means.

6. In a device of the class described, the combination with an absorption receptacle, means for feeding air charged with ether and alcohol to the bottom of said receptacle, means for feeding an acid to the top of said receptacle, an acid tank, means for carrying the acid charged with the ether and alcohol from the receptacle to said tank, means for heating said acid, an ether separating means connected with the tank, a hot water supply connected to the upper part of said ether separating means, means for heating the separating means, means for automatically controlling such heating, means for saturating and condensing the vapors of ether produced in the separating means, and an independent alcohol separating means.

7. In a device of the class described, an absorption receptacle, means for feeding the air charged with ether and alcohol to the bottom of said receptacle, means for feeding an acid to the top of said receptacle, an acid tank, means for carrying the acid charged with the alcohol and ether from the receptacle to the tank, means for heating said acid, an ether separating means connected with the tank, a hot water supply connected to the upper part of said separating means, means for heating the separating means, means for automatically controlling such heating, an ether saturator connected to said separating means, means for supplying soda water to said saturator, an ether condenser connected with the saturator, an independent alcohol separating means connected with the ether separating means, means for delivering dilute alcohol to said alcohol separating means, and means for saturating and condensing the vapors of alcohol produced in the alcohol separating means.

8. In a device of the class described, an absorption receptacle, means for feeding the air charged with ether and alcohol to the bottom of said receptacle, means for feeding an acid to the top of said receptacle, an acid tank, means for carrying the acid charged with the alcohol and ether from the receptacle to said tank, means for heating said acid, an ether separating means connected with the tank, means for feeding hot water to the upper part of said separating means, automatically controllable means for heating said separating means, an ether saturator connected to said separating means, means for feeding soda water to said saturator, a condenser connected to said saturator, an independent alcohol separating means connected with said ether separator, means for feeding dilute alcohol to said alcohol separating means, an alcohol saturator connected with the alcohol separating means, means for feeding soda water to said alcohol saturator, and means for condensing the vapors of alcohol coming from the alcohol saturator.

9. In a device of the class described, the combination with an absorption vessel, means for feeding the air charged with alcohol and ether to the bottom of said receptacle, means for feeding an acid to the top of said receptacle, an acid tank, means for carrying the acid charged with alcohol and ether from the receptacle to the tank, an ether separating means connected with said tank, an alcohol separating means normally connected with the ether separating means, and an independent connection between the acid tank and the alcohol separating means for supplying the acid directly from the tank to said alcohol separating means.

In testimony whereof I have signed my name to this specification in the presence of two subscribing witnesses.

CHARLES CREPELLE-FONTAINE.

Witnesses:
MAURICE LANOKIENT,
ADOLPHE LANOKIENT.